3,480,669
OXIDATIVE CARBONYLATION OF AROMATICS
Donald M. Fenton, Anaheim, Calif., assignor to Union Oil Company of California, Los Angeles, Calif., a corporation of California
No Drawing. Filed Sept. 8, 1966, Ser. No. 577,814
Int. Cl. C07c 63/36; C07f 3/12
U.S. Cl. 260—515                                            5 Claims This invention relates to a method for the preparation of aromatic carboxylic acids and in particular relates to a method for the oxidative carbonylation of aromatics to carboxylic acids.

This invention comprises the contacting of an aromatic with a mercuric compound and carbon monoxide to prepare aromatic carboxylic acids. The contacting of the mercuric compound with the aromatic in the presence of carbon monoxide results in the formation of an addition compound between the aromatic compound, carbon monoxide and the mercuric salt with formation of some free mercury. This addition compound can be further decomposed to prepare the aromatic carboxylic acid.

The following equations illustrate the course of the reactions:

(I)
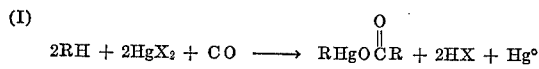
$$2RH + 2HgX_2 + CO \longrightarrow RHgO\overset{O}{\underset{\|}{C}}R + 2HX + Hg°$$

(II)
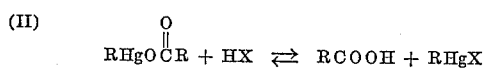
$$RHgO\overset{O}{\underset{\|}{C}}R + HX \rightleftarrows RCOOH + RHgX$$

wherein R represents an aryl or alkaryl compound having from about 6 to 25 carbons and containing from 1 to about 5 alkyl groups; and X represents oxygen or the anion of a soluble mercuric salt.

Examples of suitable aromatic reactants include benzene, naphthalene, anthracene, toluene, xylene, cumene, durene, 2,6-dimethylnaphthalene, 1,2-dimethylnaphthalene, ethylbenzene, 1,3-diethylbenzene, pseudocumene, isopropylnaphthalene, butylbenzene, 1,4-dibutylbenzene, beta-butylnaphthalene, amylbenzene, 2,6-diamylnaphthalene, phenylhexane, 1-paramethylphenyloctane, 2-orthoethylphenyldodecane, 3-para-pseudocymylheptane, 2-methylanthracene, 1,4-dimethylanthracene, etc. The aromatic substrate can also contain non-reactive substituents such as the halides, i.e., chlorine, fluorine, iodine, or bromine, e.g., chlorobenzene, dichlorobenzene, alpha-chloronaphthalene, bromoanthracene, bromopseudocumene, 6-fluoro-2-methylnaphthalene, etc.

The reaction is performed under liquid phase conditions and an inert organic solvent is employed as the reaction medium. Examples of suitable organic solvents that are inert to the reactants, catalyst and products under the reaction conditions include various ethers, esters and saturated hydrocarbons. Examples of suitable ethers include methylethyl ether, diethyl ether, diisopropyl ether, diisoamyl ether, diethylene glycol diethyl ether, triethylene glycol diethyl ether, tetraethylene glycol diethyl ether, etc.

Various esters can also be employed as a solvent e.g., methyl acetate, ethyl acetate, isopropyl acetate, ethyl propionate, sec-butyl acetate, ethyl butyrate, butyl acetate, isoamyl acetate, amyl acetate, isoamyl butyrate, ethyl acetylacetate, glycol diacetate, isoamly isovalerate, dibutyl oxalate, etc.

The saturated hydrocarbons can of course be used as a suitable inert solvent, e.g., pentane, hexane, heptane, octane, decane, dodecane, kerosene, naphtha, etc.

Other solvents that can be employed for the reaction include the aliphatic mono and di-carboxylic acids such as the alkanoic acids which include acetic acid propionic acid, butyric acid, isobutyric acid, valeric acid, pivalic acid, caprylic acid, succinic acid, decanoic acid, etc.

A source of mercuric ion is dissolved or dispersed in the reaction medium for the carbonylation. Examples of suitable sources of mercuric ion that can be employed include the various mercuric carboxylates, e.g., mercuric acetate, mercuric propionate, mercuric butyrate, mercuric isobutyrate, mercuric valerate, etc. Other mercuric salts include the salts of the strong mineral acids which are soluble in the reaction medium such as the sulfate, nitrate or phosphate, etc. In addition, mercuric oxide can also be used as a source of mercuric ions. Of the foregoing, mercuric acetate is the preferred material.

The reaction is performed under relatively mild conditions including temperatures from about 30° to about 350° C.; preferably from about 75° to 275° C. The reactants are maintained under a carbon monoxide pressure to supply the carbon monoxide reactant. The pressure chosen should be sufficient to maintain the reaction medium in liquid phase under the reaction conditions; however, pressures from 1 to about 1000 atmospheres can be used; pressures from about 10 to about 300 atmospheres being preferred. The reaction depends upon the presence of carbon monoxide and accordingly the reaction is favored by maintaining a pressure of carbon monoxide on the reaction zone to insure solubility of the carbon monoxide in the liquid phase reaction medium. Carbon monoxide pressures from about 0.5 to about 500 atmospheres can be used; pressures from about 2 to about 250 atmospheres being preferred.

The reaction can be performed in a single stage by introducing the reactants, i.e., carbon monoxide, aromatic reactant and the mercuric compound into the reaction zone containing the reaction medium at the chosen reaction temperature. The absorption of the carbon monoxide and formation of the addition compound will proceed simultaneously with the decomposition of the addition compound and formation of the aromatic acid.

The reaction can also be performed in two stages with the carbon monoxide absorption step separated from the acid formation step. In the first stage the reactant solution containing the aromatic, mercuric salt and reaction solvent is treated to saturation with carbon monoxide to form the addition product and this first stage can be performed at temperatures between about 0° and about 200° C.; preferably between about 25° and about 75° C. Carbon monoxide pressures previously mentioned are employed to favor the adsorption of the carbon monoxide and formation of the addition product.

The length of the carbon monoxide absorption stage depends somewhat on the degree of contacting achieved between the liquid gas phase. The necessary length of time can readily be determined by observing when carbon monoxide is no longer absorbed, as reflected by, e.g., the achievement of a steady reaction pressure or any other indication that a portion of the gas phase is no longer being absorbed. In general the amount of time to achieve this absorption will vary from about 5 to about 300 minutes.

Thereafter the reactants are heated in a second stage to the necessary temperature to form the aryl carboxylic acid. Preferably this heating is performed in the presence of an acid so as to directly synthesize the aromatic carboxylic acid. Suitable acids include the aqueous mineral acids such as sulfuric, nitric, hydrohalic, hydrochloric, hydrobromic, hydrofluoric, etc., or the carboxylic acids previously mentioned. Of these the fatty acids having from 2 to about 6 carbons are preferred and of these acetic acid is most preferred. The reactants are heated in the second stage to the necessary temperature to decompose the addition compound and form the aromatic carboxylic acids. Generally temperatures between about 150° and about 300° C. can be used in this stage, between about 175° and 225° C. are preferred.

The aromatic carboxylic acid can be recovered from the reaction solvent by any simple separation for aromatic carboxylic acids. These methods include selective solvent extraction or saponification of the reaction mixture with an alkali or alcohol to form a water soluble aromatic acid derivative. Examples of suitable saponifying materials include the alkali metal, ammonium or alkaline earth metal hydroxides, or low molecular weight alcohols such as methanol, ethanol, isopropanol, butanol, amyl alcohol, etc. The treatment of the crude reaction product with the saponifying materials imparts water solubility to the desired aromatic compound. Thereafter the crude reaction product can be washed with water and the aromatic derivative recovered in the water extract. Acidification of this extract will then yield the desired aromatic acid.

The mercury layer recovered in the first stage of the reaction can be recovered and oxidized by known methods to restore the mercury to a soluble mercuric compound for recycling to the reaction. Various conventional oxidizing conditions can be employed in this step, e.g., treatment with nitric acid, chromic acid, permanganates, ozone, nitrogen oxides, etc., can be employed together with oxygen when desired under temperatures from about 0° to about 250° C. to oxidize the mercury to a mercuric salt for recycling.

The following examples will serve to illustrate a mode of practicing the invention:

Example 1

A steel bomb was charged with 50 grams naphthalene, 31 grams mercuric acetate and 50 milliliters tetrahydrofuran. The bomb was closed and pressured to 1000 p.s.i. with carbon monoxide and then rocked and heated to 120° C. and maintained at that temperature for 3 hours. The bomb was then heated to 200° C. and maintained at that temperature for an additional two hours. The final reactant pressure was 925 p.s.i. The bomb was then cooled, opened and the liquid products were added to 200 milliliters benzene and the mixture was filtered to recover the mercury. The filtrate was extracted with aqueous sodium hydroxide and the aqueous layer was then acidified to obtain a mixture of naphthoic acids.

Example 2

The titanium bomb was charged with 100 milliliters benzene, 30 grams mercuric acetate and 10 grams triphenyl phosphine. The bomb was then pressured to 700 p.s.i. with carbon monoxide and heated to 120° C. and maintained at that temperature for 2 hours. Thereafter the bomb was heated to 200° C. and maintained at that temperature for 2 additional hours. The bomb was then cooled, opened and the contents were added to an aqueous solution containing 10 weight percent sodium hydroxide. The mixture was refluxed on a steam bath for 8 hours, then filtered to obtain an aqueous filtrate which was acidified to yield 3 grams benzoic acid.

The preceding examples are intended solely to illustrate the best mode of practicing my invention and to demonstrate results obtainable thereby. It is not intended that this exemplified disclosure shall be unduly limiting of the invention but rather it is intended that the invention be defined by the steps and their obvious equivalents set forth in the following method claims.

I claim:

1. The oxidative carbonylation of the ring of a carbocyclic aromatic ring compound to produce aromatic carboxylic acids that comprises contacting an aromatic compound having from about 6 to about 25 carbons and selected from the class of benzene, naphthalene, anthracene, halogen derivatives thereof having 1 to 5 halogens and alkyl derivatives thereof having from about 1 to 5 alkyl groups, said alkyl groups having from 1 to about 12 carbons; with a reaction medium comprising an inert organic solvent containing as the sole catalyst a soluble mercuric compound and carbon monoxide at a temperature between about 30° and about 300° C. and sufficient pressure to maintain liquid phase conditions.

2. The oxidative carbonylation of claim 1 wherein said aromatic compound is benzene.

3. The oxidative carbonylation of claim 1 wherein said aromatic compound is naphthalene.

4. The oxidative carbonylation of claim 1 wherein said mercuric compound is a mercuric carboxylate of an alkanoic acid having from 2 to about 6 carbons.

5. The oxidative carbonylation of claim 4 wherein said inert reaction solvent comprises an alkanoic acid having from about 2 to about 6 carbons.

References Cited

UNITED STATES PATENTS 3,316,290 4/1967 Fenton _____ 260—486

OTHER REFERENCES

Whitmore, Organic Compounds of Mercury, The Chemical Catalog Co., Inc., New York (1921) pp. 31–36.
Chemical Abstracts, vol. 48, 140g (1954).
Chatt, Chemical Reviews, vol. 48, pp. 11–17 (1951).

JAMES A. PATTEN, Primary Examiner
ALBERT P. HALLUIN, Assistant Examiner

U.S. Cl. X.R.
260—434